Sept. 24, 1940.         R. VON RADINGER         2,215,946
CIRCUIT FOR REDUCING ELECTRICAL DISTURBANCES
Filed Dec. 27, 1938
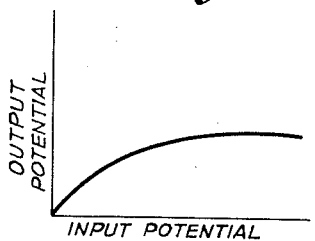
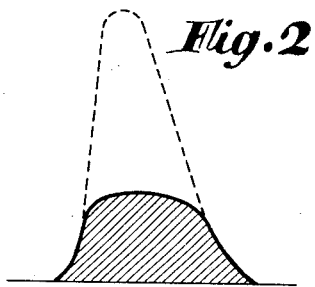
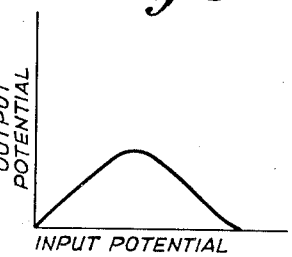
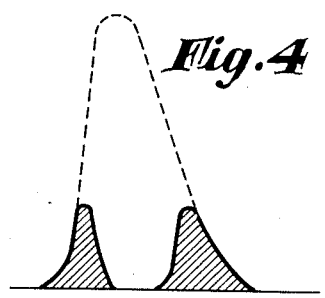
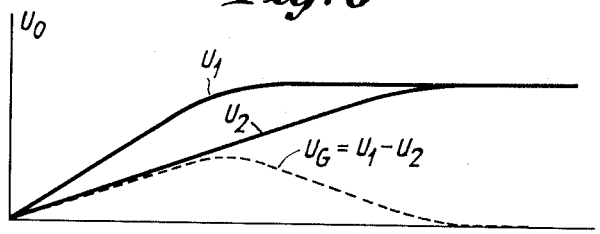
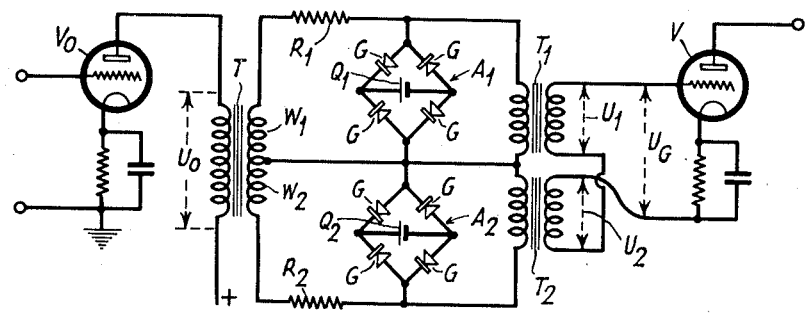
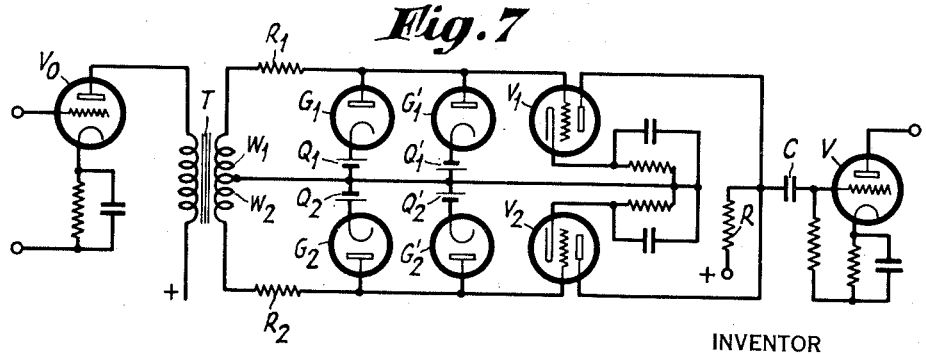
INVENTOR
RUDOLF VON RADINGER
BY
ATTORNEY Patented Sept. 24, 1940

2,215,946

UNITED STATES PATENT OFFICE 2,215,946

CIRCUIT FOR REDUCING ELECTRICAL DISTURBANCES

Rudolf von Radinger, Berlin Germany, assignor to Telefunken Gesellschaft für Drahtlose Telegraphie m. b. H., Berlin, Germany, a corporation of Germany Application December 27, 1938, Serial No. 247,900
In Germany December 22, 1937

4 Claims. (Cl. 250—20)

It is known in the earlier art to use ways and means in receivers and amplifiers to the end of reducing or suppressing crackling noises which, as soon as the signal wave exceeds a certain threshold value, cause a transient decrease in the transmission measure.

In the drawing, Figs. 1 and 3 are input-output curves characteristic of amplitude limiters of the prior art and of the present invention, respectively. Figs. 2 and 4 are explanatory diagrams of the operation of limiters having the characteristic curves of Figs. 1 and 3, respectively. Fig. 5 is one form of amplitude limiter circuit utilizing the present invention. Fig. 6 shows curves which serve to explain the method of obtaining the curve of Fig. 3 and Fig. 7 is a modified form of circuit according to the present invention.

Fundamentally, distinction has to be made between two differently acting arrangements, to wit: One group of arrangements may be classified under the caption of "amplitude limiters" in a restricted sense. In the operation of means of this type, as the input potential grows, the output potential initially grows roughly according to a straight-line law as shown in Fig. 1; but in proportion as the input potential grows still further, a more or less stable and constant value is reached. The operation of an amplitude limiter of this nature upon a shock potential which exceeds the threshold value of the limiter is illustrated in Fig. 2.

In the second group of arrangements of this nature, as the input potential increases, the output potential initially grows also in accordance to a straight-line law; but it decreases again when a certain threshold value is reached so that in the presence of a high input potential, the output potential is roughly of zero value as shown in Fig. 3. The action of this arrangement upon a shock potential is illustrated graphically in Fig. 4.

How these two arrangements act can be seen from a comparison of the energies which remain of the shock potential after the transmission measure has been cut down, in other words, from a comparison of the shaded areas. It will thus be plain that arrangements in which the output potential is a function of the input potential as shown in Fig. 3 will often cause a more marked reduction of disturbing actions than the first-named arrangements. This holds true in particular of AF amplifiers for the transmission of voice or music. The noise-suppressing or "killing" action is still further promoted because of the fact that the original crackling impulse, which, fundamentally, is comparatively brief as a general rule, is split into two extremely brief humps or peaks. As a result, the frequency content of the disturbance is shifted into the range of very high frequencies in which frequently both the transmission measure of the amplifier as well the auditory sensation have essentially decreased. As a result there occur both an additional objective and subjective reduction of the disturbance.

In spite of this situation as outlined, amplitude limiters with a characteristic as shown in Fig. 1 have in the past been preferably used for the reason that simple non-linear resistances, say, biased rectifiers, may be employed therefor. Characteristics of the kind shown in Fig. 3 have heretofore been obtainable only with comparatively complex means in which by means of rapid regulator impulses, the gain of a tube, by "forward control action" was reduced, or in which a tube included in the transmission path and acting as a switch was opened and closed. In this scheme is required a distinct transmission channel for the production and transmission of the regulating impulses. What causes particular difficulty in this case is the proper choice of the time-constant of the start and stop of the required high-speed regulator action.

Now, according to the invention a transmission characteristic as shown in Fig. 3 may be obtained by substantially simpler ways and means by providing two amplitude limiters designed for the same maximum transmitted output potential and which are impressed in the form of input potential with different fractions or portions of the potentials to be transmitted, with their output potentials being connected differentially or in opposition.

The underlying basis of the operation of the arrangement here disclosed is as follows:

As long as both amplitude limiters operate still according to a straight-line law, that is to say, in the presence of a low input potential, the output potentials of the two limiters just as their input potentials are different; as a result, there arises a difference between the output potentials which may be tapped and which is also proportional to the input potential. However, as soon as the threshold value of the two amplitude limiters has been exceeded, in other words, as soon as the input potential has assumed very large proportions, the output potentials of both limiters, regardless of the input potentials will be of equal value, and the delivered difference of the two output potentials is equal to zero.

The advantage of the invention is that the transmission characteristic shown in Fig. 3 is obtainable simply by connecting in the circuit several non-linear elements without regulating means, and that the reduction or restoration of the transmission measure is accomplishable automatically and practically without any delay.

An exemplified embodiment of the invention is shown in Fig. 5. The output alternating potential $U_0$ of the amplifier tube $V_0$ of the AF amplifier contained in a receiver is impressed upon the transformer T whose secondary winding is tapped in such a way that the two resulting portions of the winding indicated at W1 and W2 are at a ratio of turns, say, as 2:1. The outer ends of the two windings are united by way of the ohmic resistances R1 and R2 with the primary windings of the transformers T1 and T2 of like ratio of transformation. The secondary windings of the two transformers are connected in series in such a way that the partial potentials transferred by way of W1 and W2 will more or less neutralize each other. The resultant output potential $U_G$ is impressed upon the control grid of the next amplifier tube V.

In parallel relation to each of the primary windings of T1 and T2 is a rectifier assembly indicated at A1 and A2, respectively. Each of these comprises four rectifiers G and a source of D. C. potential supply Q1 and Q2, respectively, of the same potential. The rectifiers are connected in the form of a bridge, with the source of potential supply being connected in the middle arm of the bridge. The said source of supply puts such a biasing voltage upon the rectifiers that the latter, as a general rule (normally) are non-conducting; indeed, they become conducting only when the applied potential neutralizes the potential furnished from the said source of D. C. potential. Also the resistances R1 and R2 are of like value, and they are so chosen that their resistance value will be low in contrast to the resistance of the rectifier assemblies A1 and A2, in non-conducting state, but high compared with the resistance of the rectifier assembly in conducting state. The voltage acting at the primary windings of the transformers T1 and T2, therefore, in neither alternation is able to surpass the potential of the source of D. C. voltage Q1 and Q2. On the contrary, it will be held at this value when the absolute value of the voltage across W1 and W2, respectively, exceeds this limiting potential.

Plotting the primary potential U1 and U2 of transformers T1 and T2 respectively, as a function of the joint input potential $U_0$ there result graphs of the kind shown in Fig. 6. The curve $U_1$ attains its saturation even for a lower value of $U_0$, than curve $U_2$. The dash-line curve $U_G = U_1 - U_2$ is linear nearly to the very beginning of saturation of $U_1$; thereafter, it droops again and assumes zero value when $U_2$ has reached the saturation state. In other words, curve $U_G$ as a matter of fact has a shape such as shown in Fig. 3.

A slightly modified embodiment of the invention is shown by way of example in Fig. 7. In this scheme, the limited partial oscillations are impressed upon the control grids of two tubes V1 and V2 in push pull. The plates of these two tubes are connected together and are connected by way of a resistance with the positive pole of the source of voltage supply, and by way of a blocking condenser C with the control grid of the next following tube V. The amplitude limiters consist here of two rectifiers G1, G1', and G2, G2', respectively, of opposite polarity, each thereof being connected in series with a source of D. C. voltage supply Q1, Q1', and Q2, Q2', respectively. As to the rest, the circuit organization is the same as in Fig. 5.

The rectifiers may be of the dry (oxide) type or else consist of diodes.

I claim:

1. A circuit for reducing electrical disturbances comprising a pair of tubes arranged in cascade, and an amplitude limiter network interposed between the output of the first tube and the input of the second tube, said network comprising a pair of parallel branches each having included therein a plurality of rectifiers, means connected to the inputs of said branches whereby unequal potentials to be transmitted are impressed thereon, and means for differentially connecting the outputs of said branches to the input of the second tube, said branch outputs operating with the same maximum transmitted output potential.

2. A circuit for reducing electrical disturbances comprising a pair of tubes arranged in cascade, and an amplitude limiter network interposed between the output of the first tube and the input of the second tube, said network comprising a pair of parallel branches each having included therein a plurality of rectifiers, means whereby one of said branches has impressed upon its input a potential of substantially twice the value of that impressed upon the input of the other branch, and means for differentially connecting the outputs of said branches to the input of the second tube, said branch outputs operating with the same maximum transmitted output potential.

3. A circuit for reducing electrical disturbances comprising a pair of tubes arranged in cascade, and an amplitude limiter network interposed between the output of the first tube and the input of the second tube, said network comprising a pair of parallel branches each having included therein a plurality of rectifiers, a transformer coupling said branches to the output of the first tube, said transformer having unequal secondary windings which are included in their respective branches, and a second transformer differentially connecting the outputs of said branches to the input of the second tube, said branch outputs operating with the same maximum transmitted output potential.

4. A transmission channel having included therein an amplitude limiter network for reducing electrical disturbances in the output of said channel, said network comprising a pair of parallel branches, a plurality of rectifiers included in each branch means for impressing unequal input potentials upon said branches, the outputs of said branches operating with the same maximum potential which is reached by each branch for different values of input potential, and means for feeding the output potentials of said branches in opposition to a utilization circuit.

RUDOLF von RADINGER.